United States Patent [19]

Hurtado T et al.

[11] 4,109,865
[45] Aug. 29, 1978

[54] TRACTOR SPRAY CYLINDER ATTACHMENT

[76] Inventors: Jorge E. Hurtado T, 43-72 35th St., Barranquilla -Atl., Colombia; Diogenes A. Arrieta, 34-47 90th St.-53H, Jackson Heights, N.Y. 11372

[21] Appl. No.: 785,419

[22] Filed: Apr. 7, 1977

[51] Int. Cl.² ............................................. B05B 9/06
[52] U.S. Cl. ...................................... 239/147; 111/6; 222/621
[58] Field of Search ............... 239/117, 140, 141, 146, 239/147, 172; 111/6, 91; 222/401, 620, 621; 280/5 B

[56] References Cited

U.S. PATENT DOCUMENTS

| 687,396 | 11/1901 | Dunn | 222/621 |
| 2,543,888 | 3/1951 | Bunch | 111/91 |
| 2,581,674 | 1/1952 | King | 239/147 X |
| 2,593,696 | 4/1952 | Pool | 239/147 |
| 3,154,031 | 10/1964 | Kappelmann | 111/91 UX |

*Primary Examiner*—Johnny D. Cherry

[57] ABSTRACT

A spray attachment for a tractor to disperse and spray liquid pesticides, fertilizers, or the like. The spray attachment includes a cylindrical tank having a pair of wheels secured to each end thereof. Each wheel includes a series of pistons spaced about its circumference in communication with the interior of each wheel and the tank for sequentially pressurizing the tank as each wheel rotates into contact with the ground surface. Liquid from the interior of the tank and each wheel is dispensed under pressure in a spray through a series of spaced orifices extending about the side wall of each wheel adjacent its outer periphery.

4 Claims, 4 Drawing Figures

TRACTOR SPRAY CYLINDER ATTACHMENT

PRIOR ART

The following patents are considered pertinent:
U.S. Pat. No. 1,573,129
U.S. Pat. No. 2,072,331
U.S. Pat. No. 2,543,888
U.S. Pat. No. 2,581,674
U.S. Pat. No. 2,593,696
U.S. Pat. No. 2,845,884
U.S. Pat. No. 2,975,735
U.S. Pat. No. 3,333,557

BACKGROUND OF THE INVENTION

This invention relates to an agricultural implement, and more particularly, a tractor attachment for spraying water, fertilizers, pesticides, seeds, and the like in an agricultural field.

The present invention relates to an apparatus for spraying growing crops and other vegetation and for the destruction of weeds, insects, or pests and can even be used to spray fertilizer and seed. The spray liquid is carried in a tank which is pulled by a tractor between rows of growing plants and is of a sufficient height above the ground to clear the plants so as not to interfere with their growth. As the spray cylinder is drawn by the tractor, it is self-actuating to pump a fluid spray from the tank for considerable distances to each side of the tank.

SUMMARY OF THE INVENTION

In accordance with the invention, the spray cylinder includes a tank for receiving a quantity of liquid fertilizer, pesticide or the like. Connected to opposite sides of the tank are a pair of wheels which space the tank above a bed of plants and which traverse opposite sides of the bed. Disposed about the circumference of each wheel are a plurality of pump plungers for sequentially pressurizing upon contact with the ground surface the interior of the tank to cause liquid to be sprayed through a series of orifices disposed about the periphery of each wheel. Associated with each orifice is a valve element for closing the orifice upon contact with a relatively stationary bar which cams the valve element shut to close the orifice. This occurs through approximately 170° about the bottom of the wheel so that the liquid is sprayed from approximately the upper 190° of each wheel for a maximum spray effectiveness and control of wastage of the material being sprayed.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
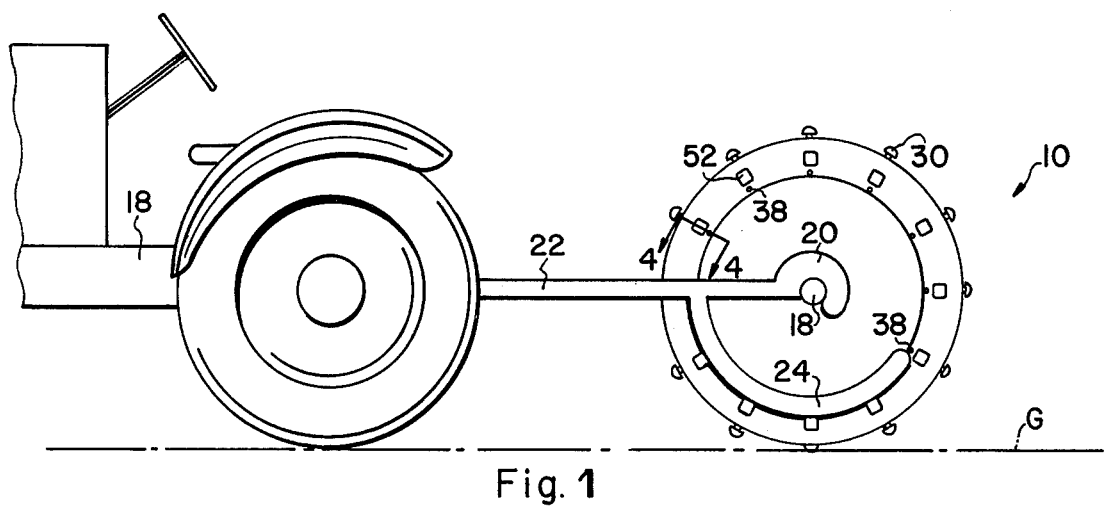
FIG. 1 is a side view in elevation of the spray cylinder attachment of the present invention attached to a tractor tow bar.
Figure 2:
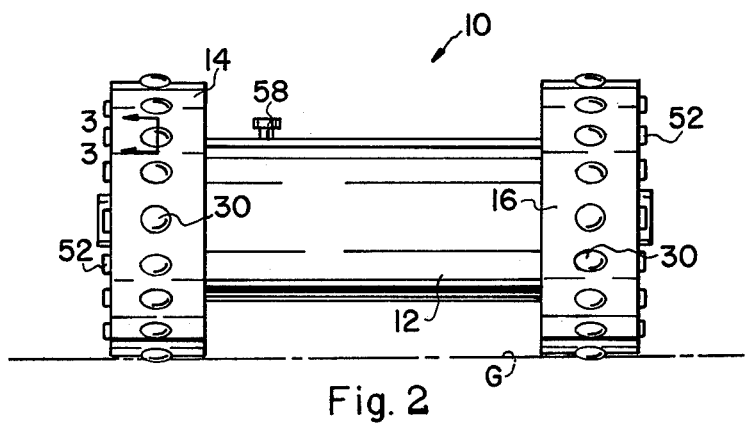
FIG. 2 is a rear view in elevation of the spray cylinder of FIG. 1.
Figure 3:
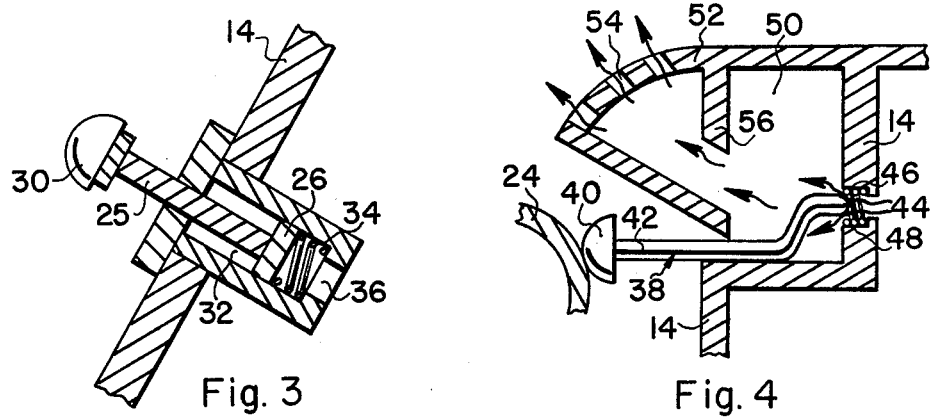
FIG. 3 is a cross sectional view taken substantially along the plane indicated by line 3—3 of FIG. 2.
Figure 4:
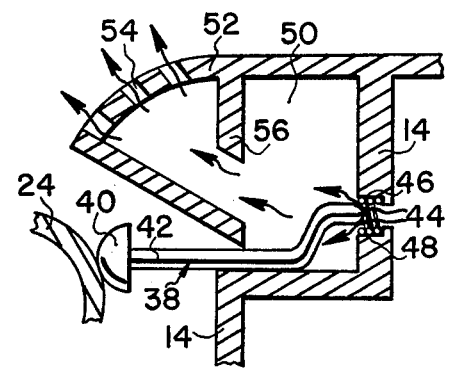
FIG. 4 is a cross sectional view taken substantially along the plane indicated by line 4—4 of FIG. 1.

Referring now to the drawing in detail, wherein like numerals indicate like elements throughout the several views, a spray cylinder 10 comprising a tank 12 having a pair of cylindrical wheels 14 and 16 connected to each end thereof is adapted to be pulled by a tractor 18 through a field under cultivation. Each wheel 14 and 16 includes a stub shaft 18 connected by a hook 20 to a tow bar 22 on the tractor 18. The tow bar 22 includes a substantially arcuate extension bar 24 which traverses approximately 170° of a circle.

Disposed about the circumference of each wheel 14 and 16 are a plurality of pump pistons 26 having a piston rod 25 terminating in an external semi-spherical head 30 exterior to each wheel 14 and 16. Piston 26 is slidably mounted in a cylindrical chamber 32 within the interior of each wheel 14 and 16 against the urging of a coil spring 34. Each chamber 32 communicates through an opening 36 with the interior of each wheel 14 and 16, which in turn is in communication with the interior of tank 12.

Extending outwardly from the side wall of each wheel 14 and 16 adjacent its periphery is a valve 38 having a semi-spherical head 40 connected to one end of a valve stem 42 terminating in a conical point 44. Conical point 44 is in frictional engagement with the interior of a coil spring 46 seated in an opening 48 in the side wall of each wheel 14 and 16. Opening 48 is in communication with the interior of each wheel, which in turn communicates with the interior of tank 12.

Valve stem 42 is disposed within a chamber 50 comprising an extension of the upper portion of the side wall of each wheel 14 and 16. Chamber 50 includes a hood 52 having a plurality of spray openings 54 in communication with the interior of chamber 50. A baffle 56 extends downwardly from hood 52 into the interior of chamber 50.

In use, a quantity of a liquid fertilizer, pesticide, etc. is disposed within tank 12 through a removable cap 58. The tank and the interior of each wheel 14 and 16 are filled with fertilizer, pesticide, etc.

Hook 20 on tow bar 22 is then connected to the stub axles 18 on opposite wheels 14 and 16. Wheels 14 and 16 as well as tank 12 will rotate in contact with the ground G relative to fixed tow bar 22 having arcuate extension 24. Heads 30 connected to piston rods 25 will sequentially in turn contact ground surface G as the wheels rotate through 360°. Contact of the head 30 with the ground G will cause piston rod 25 to move inwardly against the bias of spring 34 to pressurize the interior of each wheel 14 and 16 and tank 12 to cause liquid to be dispensed from each wheel 14 and 16 and tank 12 through openings 48 past conical point 44 of valve stem 42, beneath baffles 56, and out openings 54 in each hook 52 onto adjacent rows of plants under cultivation. Because of the conical point 44, the liquid dispensed through opening 48 is broken up or atomized into a spray which is further broken up by baffle 56.

During the rotation of each wheel 14 and 16, the semi-spherical head 40 on each valve stem 42 will come in contact with relatively stationary arcuate bar 24 which will cam valve stem 42 to a closed position in its orifice 48 against the bias of coil spring 46 for approximately the lower 170° of arcuate travel of each wheel 14 and 16, precluding spray from being dispensed from each wheel 14 and 16 through the lower portion of each wheel in order to maximize the effectiveness of the spray and its distribution which will be greatest from the upper openings 54 wherein it will have the greatest throw of dispersion.

As each spherical head 30 on the end of piston rod 25 leaves contact with the ground G, spring 34 will return piston rod 25 to an upper position ready for activation when it contacts the ground once again.

While a specific embodiment of a tractor spray cylinder attachment has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A spray attachment for a tractor comprising:

a tank adapted to receive liquids to be sprayed onto an agricultural field, a wheel secured to each end of said tank having a hollow interior in communication with the interior of said tank, a plurality of pistons mounted about the circumference of each wheel in a cylinder having an opening in the bottom thereof in communication with the interior of each of said wheels, each of said pistons including a piston rod having a head for engagement with the ground sequentially as said wheel rotates along said ground to pressurize the interior of each of said wheels and said tank, a series of spray orifices spaced about a side wall of each of said wheels in communication with the interior of each of said wheels for dispensing liquid from the interior of each of said wheels to an exterior field under cultivation, and valve means selectively operable to open and close said orifices in response to the position of said orifice on said wheel.

2. The spray cylinder of claim 1 wherein said valve means includes a tow bar adapted to be secured to a tractor vehicle having an arcuate extension parallel to a lower portion of each of said wheels, said tow bar extension being relatively stationary with respect to each of said wheels to contact a portion of a spring loaded valve extending into each of said orifices to cause said valve to close said orifice when said valve rotates into contact with said arcuate extension.

3. The spray attachment of claim 2 wherein said valve includes a conical point in line with said orifice for atomizing liquid dispensed through said orifice.

4. The spray attachment of claim 3 including a hood having a plurality of dispensing openings above each of said valves.

* * * * *